United States Patent [19]
Gürtler et al.

[11] Patent Number: 5,561,001
[45] Date of Patent: Oct. 1, 1996

[54] ACCUMULATOR WITH DEGASSING CHANNEL

[75] Inventors: Josef Gürtler, Bad Sassendorf-Weslarn; Ulrich Wulf; Detlef Scholz, both of Soest, all of Germany

[73] Assignee: Hagen Batterie AG, Soest, Germany

[21] Appl. No.: 431,192

[22] Filed: Apr. 28, 1995

[30] Foreign Application Priority Data

Apr. 29, 1994 [DE] Germany .............................. 9407172 U

[51] Int. Cl.$^6$ ...................................................... H01M 2/12
[52] U.S. Cl. ................... 429/86; 429/82; 429/175
[58] Field of Search ................................. 429/86, 82, 175

[56] References Cited

U.S. PATENT DOCUMENTS 4,403,019  9/1983  Poe .............................................. 429/82
4,463,069  7/1984  Greenlee ..................................... 429/86
5,298,344  3/1994  Stocchiero ................................. 429/86

*Primary Examiner*—Kathryn Gorgos
*Assistant Examiner*—Kishor Mayekar
*Attorney, Agent, or Firm*—Townsend and Townsend and Crew LLP

[57] ABSTRACT

The cover (11) of an accumulator has a degassing channel (12) which connects the interior space (36) of one or more cells, with a side channel (14) formed in a side wall (13) of the cover (11). The side channel (14) is sealingly closed by a cover plate (15). At the beginning of the side channel (14), a porous body (17) is provided in a surround (20), whilst, in the end region of the side channel (14), a depression (23) is located, the depression (23) being provided in a cover plate and having a base (24) in which a gas outlet opening (16) is provided.

17 Claims, 2 Drawing Sheets

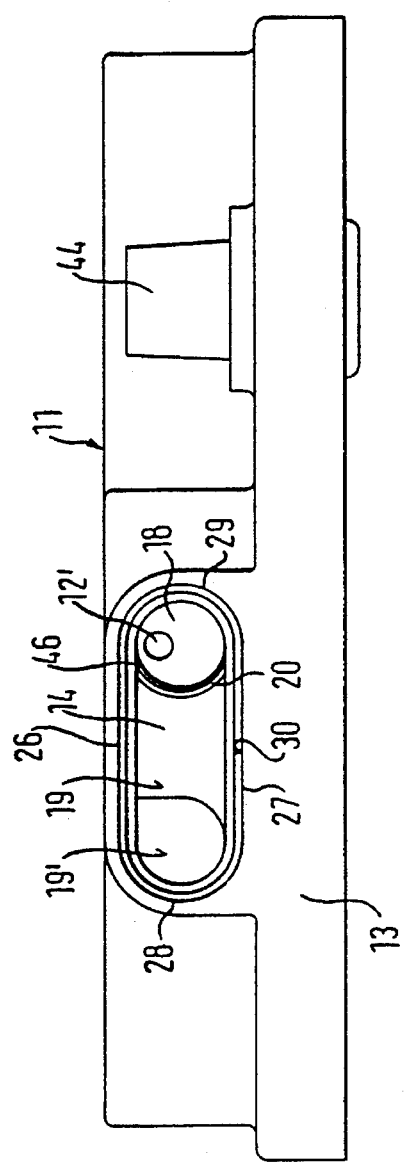
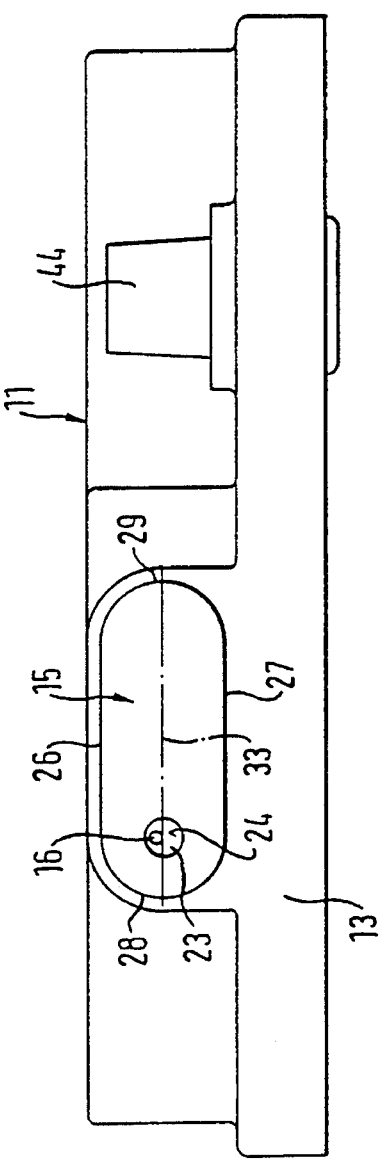
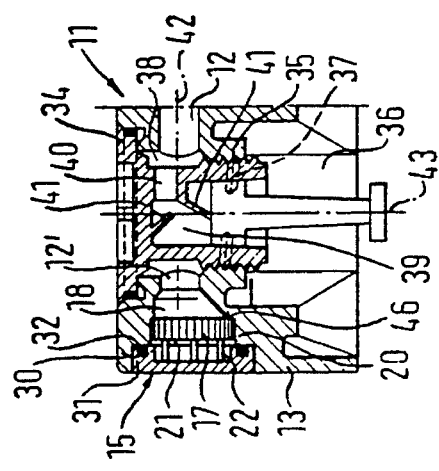
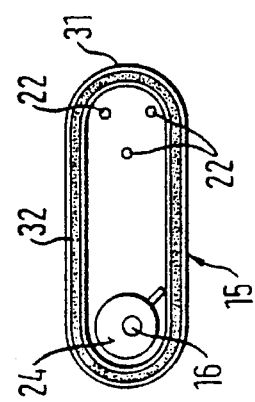

5,561,001

ACCUMULATOR WITH DEGASSING CHANNEL

BACKGROUND OF THE INVENTION

The invention relates to an accumulator comprising an electrolyte fluid, such as sulphuric acid.

In a known accumulator of this kind (DE 93 12 250 U) there are only a pair of shock surfaces at the transition from the degassing channel to the side channel and the porous body is arranged in a projection of the cover plate near the gas outlet opening of the side channel. This can lead to a poor seal between the cover plate and the accumulator housing which lowers the effectiveness of the back-flash protection of the porous body and, furthermore, can lead to unhindered emission of acid mist from the interior of the accumulator. Furthermore, mounting the porous body on the cover plate presents manufacturing difficulties.

SUMMARY OF THE INVENTION

The object of the present invention is to improve the known accumulator and, in particular, to ensure that in cases when the cover does not tightly seal, no danger of back-flash exists and to ensure that the unhindered emission of acid mist is prevented.

The present invention is directed to an accumulator comprising a housing having one or more cells containing electrolyte fluid. A cover seals the upper side of the housing and a plurality of degassing channels extending substantially horizontally through the housing and communicate the cells with a sidewall of a cover. A gas permeable disc has an outer side facing the sidewall of the cover and an inner side facing the degassing channels and is oriented substantially perpendicular to the degassing channels. The outer side of the gas permeable disc and the sidewall of the cover define a gas transit gap therebetween. The accumulator further comprises a lateral cover plate having an end region that defines a lateral gas outlet opening remote from the degassing channels. An elongate side channel extends horizontally and perpendicularly to the degassing channels to communicate the gas transit gap with the lateral gas outlet.

Since the porous body is arranged right at the beginning of the side channel, the existence of an untight seal between the cover plate and the accumulator cover does not result in any danger of an external flame or spark penetrating or discharging into the accumulator. Moreover, the acid mist is substantially caught by the porous body so that, if the cover plate becomes untight, the acid mist cannot be emitted, at least not to a significant extent, to the outside.

Since, after its fitting, the porous body forms a component part of the accumulator cover, it does not need to be secured to the cover plate, so that the cover plate is not only substantially simpler and more economic to manufacture, but is also easy to handle and mount.

Specific embodiments of the invention ensure that the flow speed of the gases being emitted from the interior of the accumulator is already heavily reduced in the region of the porous body and thereafter, so that an effective condensation of the acid droplets is achieved. These acid droplets preferably collect in the lower part of the porous body and thus scarcely hinder the passage of gas through the upper part. Should very heavy condensation of acids out of the emitted gas occur, the liquid acid can be collected in the lower part of the side channel. The upper part then remains fully available for conveying the gas.

In exemplary embodiments, a problem-free holding and a space-saving accommodation of the porous body is achieved, the porous body preferably having the form of a round disc. A sharp deviation of the gas stream takes place inside the gas transit gap and promotes the condensing out of acid droplets from the emitted gas. This prevents fluid being transported as far as the outlet opening.

The gases flowing horizontally through the side channel are deviated once again before entering into the gas outlet opening. This induces the condensing out of any remaining acid droplet contributions. This design reliably ensures that the gas emitted from the cover of the accumulator is substantially free of acid mist.

BRIEF DESCRIPTION OF THE DRAWINGS

The invention is described in the following by means of example only with the aid of the figures which show:

FIG. 2 a section through the line II—II of FIG. 1;

FIG. 3a a view of the accumulator cover of FIG. 1 in the direction of the arrow III of FIG. 1—with the cover plate removed;

FIG. 3b a side view corresponding to that of FIG. 3a, but with the cover plate in place; and FIG. 4 an inner view of the cover plate of FIG. 3b pivoted by 180° about the axis 33 shown in FIG. 3b.

DESCRIPTION OF THE SPECIFIC EMBODIMENTS

Figure 1:
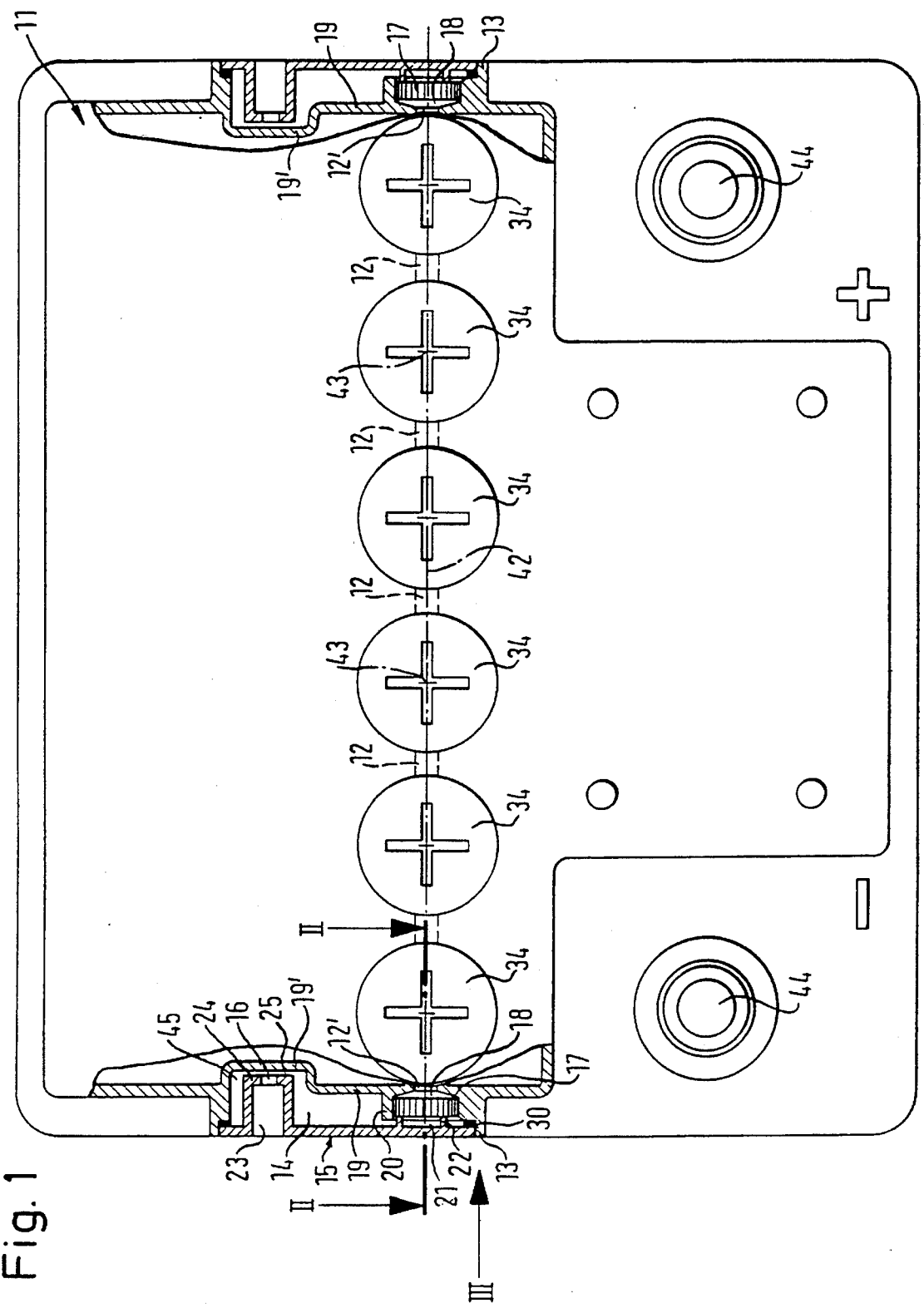
FIG. 1 a plan view onto the cover of an accumulator in accordance with the invention.

In FIG. 1, six screw plugs 34 are arranged in line at a defined separation along the long horizontal central axis 42 in the rectangular cover 11 of a battery, the battery terminals 44 are also shown in FIG. 1. As shown in FIG. 2, the screw plugs 34 are each screwed into a threaded bore 35 so as to form a seal. The screw plugs 34 seal off on the upper side the interior spaces 36 of the cells of the battery, the cells containing for example sulphuric acid. The sealing action of the screw plug is provided by an 0-ring arranged above the thread. This 0-ring can be seen in FIG. 2 directly under the reference line to the reference numeral "34". The threaded bores 35 are connected to each other via straight degassing channels 12 which extend along the horizontal central axis 42. The flow path through these channels is therefore interconnected. As illustrated in FIG. 2, the screw plugs 34 have a circumferential recess or waist 38 above the screw thread which, on each diametrically oppositely lying side, lies adjacent one degassing channel 12.

As shown in FIG. 2, each of the screw plugs 34 possesses a cavity 39 which is open in the downward direction. The cavity 39 is in connection with the interior 36 of the relevant battery cell and opens out into the circumferential recess 38 via a radial bore 40. In the region of the transition of the radial bore 40 into the cavity 39, interposed walls or vanes 41 are provided and form chicanes which force the gases flowing out of the interior 36 into the circumferential recess 38 to perform a plurality of directional flow changes. This acts to withhold liquid which has been carried with the gas.

The horizontal central axis 42 extends through the vertical central axis 43 of the screw plugs 34.

As a rule, the degassing channels 12 between the threaded bores 35 are of equal length. In contrast, there are also two substantially shorter degassing channels 12' each of which extending from the respective threaded bore 35 lying closest to the respective side walls of the cover 11 up to a funnel-shaped channel region 18. In the direction of the side walls 13, a peripheral surround or rim 20 adjoins and a circular disc-shaped porous body 17, such as a frit, is sealingly fitted into this peripheral surround 20. The two planar end surfaces of the porous body 17 are arranged vertically so that gas flowing out of the degassing channel 12' into the funnel-shaped channel region 18 can flow through the porous body 17 from its one end surface to its oppositely lying one.

The surround 20 protrudes from the inner side wall 19 from two side channels 14 provided on opposite sides of the cover 11. These side channels 14 extend from the surround 20 in a horizontal direction away from the battery terminals 44.

As illustrated in FIG. 3a, the side channels 14 have an oval shape with two horizontal straight sections 26 and 27 (one upper one and one lower one) arranged therebeneath with a given separation therefrom as well as two semi-circular sections 28 and 29 arranged at respective ends of the straight sections. An elongate flow path in the horizontal direction is thus provided for the gases being emitted out of the interior of the battery.

In the region which directly laterally follows from the surround 20, the side channel 14 initially has a constant depth but then, in the region of the semi-circular end section 28, has a discontinuous recess 45 which is also of constant depth. A set-back wall portion 19' thus exists.

To form a gas-tight and liquid-tight closure, the side channels 14 are, as illustrated in FIG. 3b, closed off to the outside by a cover plate 15 which is illustrated as viewed from the inside in FIG. 4. The cover plate 15 is complementary to the side channel 14 and to the bordering surround 20. The cover plate 15 also possesses an edge which projects towards the cover 11 with sealing means 32 projecting towards the cover 11, this being shown in FIGS. 2 and 4. When the cover plate 15 is placed on the side channel 14, the edge 31 of the cover plate 15 engages into a step recess 30 surrounding the edge of the side channel 14 remote from the side wall 13 of the cover 11. The depth of the step recess 30 is selected such that the cover plate 15, when placed on the side channel 14, lies flush with the side wall 13.

In the region of the set-back portion 19' of the side wall 19 provided towards the inside of the cover 11, the cover plate 15 possesses a circular cylindrical depression 23 extending towards the inside of the cover 11. A gas outlet opening 16 is provided in the base 24 of the depression 23. This base 24 extends into the recess 45 of the side wall 12 of the side channel 14 and forms a narrow gas transit gap 25 with the set-back wall portion 19'.

In the region of the porous body 17, three holder projections 22 are provided. These holding projections 22 are arranged distributed evenly over the periphery and extend from the inside of the cover plate 15 up to the outer facing end surface of the porous body 17, whereby the porous body 17 is securely held against a ring step 46 inside the surround 20. As a result of this design, a gas transit gap 21 is formed between the inner wall of the cover plate 15 and the surround 20 or the porous body 17, i.e. between the holding projections 22. This gas transit gap 21 is in flow communication with the subsequent horizontal side channel 14.

As can be seen in FIGS. 2 and 3a, the degassing channel 12' opens out opposite the upper half of the circular porous body 17 so that the funnel-shaped region is formed in an asymmetrical manner such that the funnel-shaped walls form a substantially larger angle relative to the axis 42 in the downward direction than in the upper region.

This ensures that the gas emerging from the degassing channel 12 and passing into the funnel-shaped region 18 flows predominantly through the upper region of the porous body 17.

In the illustrated embodiment, the inside diameter of the recess 23 amounts to 5.9 mm.

Degassing of the battery described takes place as follows:

If, when charging the battery, gases arise in the interior space 36 (FIG. 2), these gases flow through the cavity 39 of the screw plug 34 past the interposed walls 41 and into the radial channel 40, whereupon they pass via the circumferential recess 38 into the bordering degassing channels 12 and 12'. From there, the gases flow to one of the two funnel-shaped channel regions 18 provided on opposite sides of the cover 11 and then pass through the porous body 17. Acid mist contained in the gas is already substantially condensed out by the interposed vanes 41 and the porous body 17.

The flow direction of the gas passing out of the porous body 17 is deviated by approximately 90° in the region of the gas transit gap 21 and then passes through the large-volume side channel 14 to the recess 45 and through the further gas transit gap 25 into the gas outlet opening 16. From there, the gas then passes through the depression 23 and into the atmosphere. Before entering the gas outlet opening 16, the gas flow experiences a further 90° deviation. As a result of this construction, it is ensured that any acid mist still remaining in the gas subsequent to passing through the porous body 17 is condensed out in the side channel 14 and collects as liquid on the base of the side channel 14 so that there is no danger that acid mist passes to the outside through the gas outlet opening 16. An important factor here is that the outlet opening 16 is located in the upper part of the base 24 of the depression 23 as shown in FIGS. 3b and 4. Due to the fact that the porous body 17 is positioned a substantial distance away from the gas outlet opening 16, the side channel 14 permits a deliberate and well-defined small gas explosion, if, in the region of the gas outlet opening 16, flashes or ignition occurs. This defined explosion does not damage the battery and does not have any damaging effect on the environment and, firstly, blows out a flame present at the gas outlet opening 16 and, secondly, temporarily prevents any more ignitable mixture flowing out of the interior 36 due to the high pressure built up inside the side channel 14. The porous filter body 17 thus forms a divider between an explosion space (side channel 14) for the formation of a deliberate but unharmful gas explosion and a region protected from the explosion, this latter region being formed by the spaces 12, 18, 36, 39 and 40. The small explosion in the side channel 14 helps protect this region. Moreover, the high temperature of the reaction gases produced by the explosion is partially reduced by the melting of plastic grains in the porous filter disc 17. Therefore, all in all, a gas explosion occurring in the side channel 14 can actually be viewed as beneficial.

The cylindrical depression 23 is provided with a standard diameter of 5.9 mm so that pluggable parts, such as for example acid collecting containers, sealing plugs or an angle piece with a hose fitting, can be plugged into it in the conventional manner, in order that charging gases and/or acid mist can be guided to the outside from the inside of the vehicle battery.

It is especially preferred when a further porous body of complementary form is plugged into the depression 23 whereby a multiple security against back-ignition and the emission of acid mist is achieved.

A substantial aspect of the invention is thus that the standard 5.9 mm cylindrical plug depression 23 is provided in connection with the gas outlet opening 16 and does not negatively effect the function of the back-flash prevention and the efficient condensing out of acid mist.

Moreover, it is important for the functioning that the degassing channel 12' passes into the porous body 17 via the channel region 18 of substantially widened cross-section and that this widened cross-section is substantially maintained within the side channel 14 up to the gas outlet opening 16.

The large-volume side channel 14 is dimensioned such that its lower part also forms a large acid catching container while its upper region serves for a substantially low resistance gas transmission passageway.

In order to provide a particularly reliable, air-tight and gas-tight arrangement of the cover plate 15, the cover plate 15 connected to the material of the cover 11 by means of a heating element ultrasound weld.

In comparison to known arrangements, a substantial advantage of the construction of the invention is that complete protection against back-flash is provided even when the cover plate 15 is damaged or even when it has been porously welded or when it has become leaky for some other reason. This protection is given due to the fact that the porous body 17 is not mounted in the cover plate 15, but rather inside the surround 20 which forms a component part of the cover 11. A further advantage of the invention is that the integral construction avoids any parts projecting from the side wall 13 of the cover 11.

It is important that the side channels 14 extend from the porous body 17 in a direction leading away from the battery terminals 44, whereby the final discharge of the gas into the surroundings takes place as far away as possible from the battery terminals 44, where sparking tends to occur.

It is of particular advantage that the porous body is located at the entrance into the side channel 14 and not at its outlet, at the outlet only a simple bore is provided in the form of a gas outlet opening 16.

| Reference Numerals | |
|---|---|
| 11 | cover |
| 12 | degassing channel |
| 12' | degassing channel |
| 13 | cover side wall |
| 14 | side channel |
| 15 | cover plate |
| 16 | gas outlet opening |
| 17 | porous body |
| 18 | widened channel region |
| 19 | side wall |
| 19' | set-back wall portion |
| 20 | surround |
| 21 | gas transit gap |
| 22 | holding projections |
| 23 | depression |
| 24 | base |
| 25 | gap |
| 26, 27 | straight section |
| 28, 29 | semi-circular section |
| 30 | step recess |
| 31 | edge of the cover plate |
| 32 | sealing means |
| 33 | axis |
| 34 | screw plug |
| 35 | threaded bore |
| 36 | internal space |
| 37 | screw thread |
| 38 | circumferential recess (waist) |
| 39 | cavity |
| 40 | radial bore |
| 41 | interposed walls (vanes) |
| 42 | horizontal central axis |
| 43 | vertical central axis |
| 44 | terminal |
| 45 | recess |
| 46 | ring step |

We claim:

1. An accumulator comprising:
   a housing having an upper side and one or more cells each defining an interior space for housing an electrolyte fluid;
   a cover sealing the upper side of the housing and having at least one sidewall;
   the housing defining a plurality of degassing channels in communication with the interior space and extending substantially horizontally through at least a portion of the housing to the sidewall of the cover;
   a gas permeable disc having an outer side facing the sidewall of the cover and an inner side facing the degassing channels and being oriented substantially perpendicular to the degassing channels, the outer side of the gas permeable disc and the sidewall of the cover defining a gas transit gap therebetween; and
   a lateral cover plate having an end region defining a lateral gas outlet opening remote from the degassing channels, the lateral cover plate defining an elongate side channel extending substantially horizontal and substantially perpendicular to the degassing channels, the elongate side channel communicating the gas transit gap with the lateral gas outlet opening and extending a distance therebetween sufficient to form an explosion space for controlled gas combustion, the elongate side channel having a vertical depth sufficient to retain condensed acid from gas passing therethrough.

2. The accumulator of claim 1 further comprising a channel region that expands outward in a funnel-shape from the degassing channels to the inside wall of the gas permeable disc.

3. The accumulator of claim 2 wherein one of the degassing channels is aligned with an upper portion of the gas permeable disc, the channel region expanding outward in a lateral and downward direction from said one of the degassing channels.

4. The accumulator of claim 1 wherein the elongate side channel defines an inner sidewall having an annular projection, the gas permeable disc being disposed within the annular projection.

5. The accumulator of claim 4 further comprising one or more holding projections extending from the cover plate to secure the gas permeable disc within the annular projection.

6. The accumulator of claim 4 wherein the cover plate defines an inwardly directed depression having a sidewall and a base, the lateral gas outlet opening being located within the base.

7. The accumulator of claim 6 wherein the depression is cylindrical and defines a longitudinal axis, the base extending perpendicular to the longitudinal axis.

8. The accumulator of claim 7 wherein the base of the depression and the inner sidewall of the side channel form the gas transit gap therebetween.

9. The accumulator of claim 8 wherein the inner sidewall has a recessed portion, the base of the depression extending into the recessed portion.

10. The accumulator of claim 9 wherein the gas outlet opening is offset from a center of the depression.

11. The accumulator of claim 1 wherein the gas permeable disc has a height substantially equal to the vertical depth of the side channel.

12. The accumulator of claim 1 wherein the cover plate and the elongate side channel have a horizontally aligned oval shape with a pair of horizontal straight sections and a pair of semi-circular sections.

13. The accumulator of claim 1 wherein the vertical depth of the side channel is constant.

14. The accumulator of claim 1 wherein the cover plate defines a complementary step recess extending around the elongate side channel and flush with said at least one sidewall of the cover.

15. The accumulator of claim 1 wherein the cover plate defines an edge projecting towards the side channel and sealing means provided at the edge.

16. The accumulator of claim 1 wherein the cover plate is bonded to the cover.

17. The accumulator of claim 1 wherein the elongate side channel comprises an upper portion and a lower portion, the upper portion being vertically aligned with the degassing channels and the lower portion being spaced below the degassing channels.

* * * * *